(12) United States Patent
Waltermann et al.

(10) Patent No.: US 8,477,624 B2
(45) Date of Patent: Jul. 2, 2013

(54) APPARATUS, SYSTEM, AND METHOD FOR MANAGING NETWORK BANDWIDTH

(75) Inventors: Rod D. Waltermann, Rougemont, NC (US); Joshua N. Novak, Wake Forest, NC (US)

(73) Assignee: Lenovo (Singapore) Pte. Ltd, Tech Park (SG)

( * ) Notice: Subject to any disclaimer, the term of this patent is extended or adjusted under 35 U.S.C. 154(b) by 394 days.

(21) Appl. No.: 12/059,872

(22) Filed: Mar. 31, 2008

(65) Prior Publication Data
US 2009/0245111 A1    Oct. 1, 2009

(51) Int. Cl.
*G01R 31/08* (2006.01)

(52) U.S. Cl.
USPC .......................................... 370/236; 370/235

(58) Field of Classification Search
USPC .................................. 370/236, 235
See application file for complete search history.

(56) References Cited

U.S. PATENT DOCUMENTS

| | | | | |
|---|---|---|---|---|
| 5,867,483 | A * | 2/1999 | Ennis et al. | 370/252 |
| 6,202,091 | B1 * | 3/2001 | Godse | 709/222 |
| 6,625,118 | B1 * | 9/2003 | Hadi Salim et al. | 370/229 |
| 7,426,181 | B1 * | 9/2008 | Feroz et al. | 370/232 |
| 7,433,943 | B1 * | 10/2008 | Ford | 709/223 |
| 7,509,377 | B2 * | 3/2009 | Harvey et al. | 709/206 |
| 2003/0182421 | A1 * | 9/2003 | Faybishenko et al. | 709/224 |
| 2006/0056300 | A1 * | 3/2006 | Tamura et al. | 370/235 |
| 2006/0250959 | A1 * | 11/2006 | Porat | 370/230 |
| 2009/0182874 | A1 * | 7/2009 | Morford et al. | 709/224 |

FOREIGN PATENT DOCUMENTS

WO    WO0225880    *    3/2002

* cited by examiner

*Primary Examiner* — Mark Rinehart
*Assistant Examiner* — Angel Brockman
(74) *Attorney, Agent, or Firm* — Kunzler Law Group

(57) ABSTRACT

An apparatus, system, and method are disclosed for managing network bandwidth. A monitor module monitors traffic of a plurality of peer computers over a Transmission Control Protocol/Internet Protocol (TCP/IP) network. A detection module detects traffic exceeding a traffic threshold for the network. A delay module delays issuing each TCP/IP acknowledge signal for a specified delay interval in response to detecting the traffic exceeding the traffic threshold.

19 Claims, 7 Drawing Sheets

APPARATUS, SYSTEM, AND METHOD FOR MANAGING NETWORK BANDWIDTH

BACKGROUND OF THE INVENTION

1. Field of the Invention

This invention relates to network bandwidth and more particularly relates to managing network bandwidth.

2. Description of the Related Art

Networks are increasingly important for computers. For example, many computers connect to a Transmission Control Protocol/Internet Protocol (TCP/IP) network to receive data, software updates, application software, and authorization keys. As a result, it is vital to a computer have access to sufficient TCP/IP bandwidth.

Typically a plurality of computers share access to TCP/IP network. As each computer transfers more data across the TCP/IP network, the network traffic increases and the available TCP/IP bandwidth decreases. As network traffic increases, each computer may need to wait longer to transfer data across the TCP/IP network. Thus the performance of each computer is slowed.

The need for sufficient TCP/IP bandwidth is particularly acute for diskless computers. A diskless computer may store software and data on a storage system such as a Storage Area Network (SAN). The diskless computer may load an operating system from the SAN, load application programs from the SAN, and access data from the SAN.

The loading of an operating system across the TCP/IP network requires significantly more data be transferred than for many other types of data transfer. For example, while an e-mail transaction may require the transfer of one hundred kilobytes (100 kB) of data, the loading of an operating system may require the transfer of hundreds of megabytes (MB) of data.

When network utilization is high, data transfers are substantially slowed. As a result, the performance of the diskless computer may be significantly impaired.

SUMMARY OF THE INVENTION

From the foregoing discussion, there is a need for an apparatus, system, and method that manages network bandwidth. Beneficially, such an apparatus, system, and method would slow some data transfers to make more network bandwidth available.

The present invention has been developed in response to the present state of the art, and in particular, in response to the problems and needs in the art that have not yet been fully solved by currently available network bandwidth management methods. Accordingly, the present invention has been developed to provide an apparatus, system, and method for managing network bandwidth that overcome many or all of the above-discussed shortcomings in the art.

The apparatus to manage network bandwidth is provided with a plurality of modules configured to functionally execute the steps of monitoring traffic, detecting traffic exceeding a traffic threshold, and delaying issuing each TCP/IP knowledge signal. These modules in the described embodiments include a monitor module, a detection module, and the delay module.

The monitor module monitors traffic of a plurality of peer computers over a TCP/IP network. The detection module detects traffic exceeding a traffic threshold for the network. The delay module delays issuing each TCP/IP acknowledge signal for a specified delay interval in response to detecting the traffic exceeding the traffic threshold.

A system of the present invention is also presented to manage network bandwidth. The system may be embodied in diskless peer computers that store data on a SAN. In particular, the system, in one embodiment, includes a TCP/IP network and a plurality of peer computers. Each peer computer includes a monitor module, a detection module, and a delay module.

The monitor module monitors TCP/IP network traffic. The detection module detects traffic exceeding a traffic threshold for the network. The delay module delays issuing each TCP/IP acknowledge signal for a specified delay interval in response to detecting the traffic exceeding the traffic threshold.

A method of the present invention is also presented for managing network bandwidth. The method in the disclosed embodiments substantially includes the steps to carry out the functions presented above with respect to the operation of the described apparatus and system. In one embodiment, the method includes monitoring traffic, detecting traffic exceeding a traffic threshold, and delaying issuing each TCP/IP knowledge signal.

A monitor module monitors traffic of a plurality of peer computers over a TCP/IP network. A detection module detects traffic exceeding a traffic threshold for the network. A delay module delays issuing each TCP/IP acknowledge signal for a specified delay interval in response to detecting the traffic exceeding the traffic threshold.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention delays issuing TCP/IP acknowledge signals to manage network bandwidth. In addition, the present invention may delay some data transfers in order to speed other data transfers. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
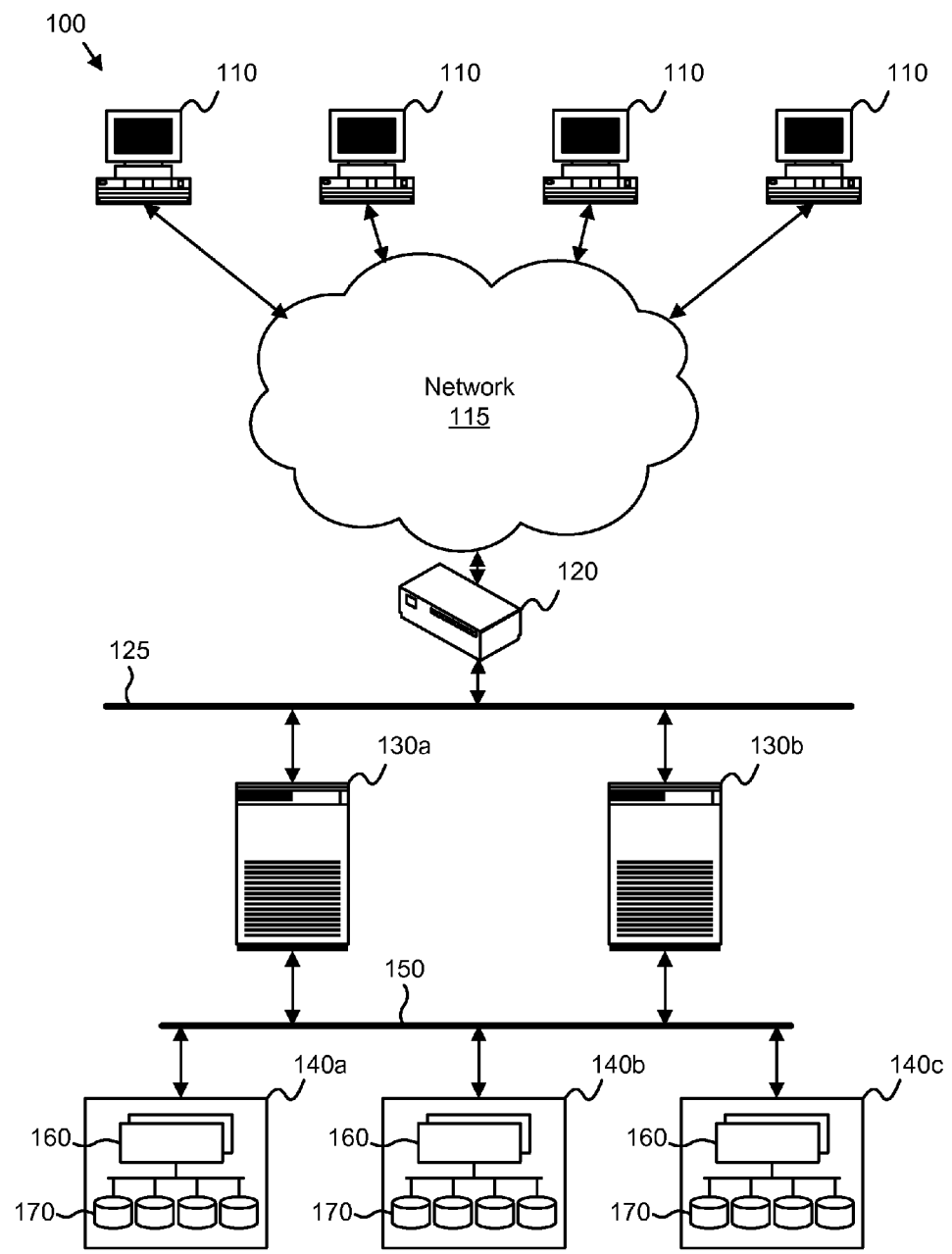
FIG. 1 is a schematic block diagram illustrating one embodiment of a data processing system in accordance with the present invention.

FIG. 1 is a schematic block diagram illustrating one embodiment of a data processing system (DPS) 100 in accordance with the present invention. The DPS 100 includes one or more peer computers 110, a network 115, a router 120, an internal network 125, one or more servers 130, a storage communications channel 150, and one or more storage subsystems 140.

In one embodiment, the peer computers 110 are diskless computers. The servers 130 may be configured as mainframe computers, blade centers comprising multiple blade servers, and the like. Although for simplicity four peer computers 110, one network 115, one router 120, one internal network 125, two servers 130, one storage communications channel 150, and three storage subsystems 140 are shown, any number of peer computers 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices. Alternatively, the storage device 170 may also be configured as a just a bunch of disks (JBOD), a redundant array of independent disks (RAID), a tape library, a tape backup, a tape library, a compact disk read only memory (CD ROM) library, and the like. In one embodiment, the servers 130 and the storage subsystems 140 are configured as a Storage Area Network (SAN).

In one embodiment, the DPS 100 provides data storage and data manipulation services for the peer computers 110. For example, a peer computer 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the peer computer 110.

The network 115 connecting the peer computers 110 and the servers 130 is configured as a TCP/IP network. Diskless peer computers 110 may store an operating system, application software, and data on one or more storage subsystems 140. When a diskless peer computer 110 boots, the diskless peer computer 110 loads the operating system. In addition, when the diskless peer computer 110 loads any application or data, the application and/or data is retrieved from the storage subsystems 140.

Loading large images such as an operating system requires significant amounts of network bandwidth. However, if other peer computers 110 are also using significant amounts of network bandwidth, operations such as loading large images may be slowed considerably. The present invention manages network bandwidth as will be described hereafter. In one embodiment, the present invention slows the utilization of network bandwidth by some peer computers 110 to allow other peer computers 110 to complete bandwidth intensive operations.

Figure 2:
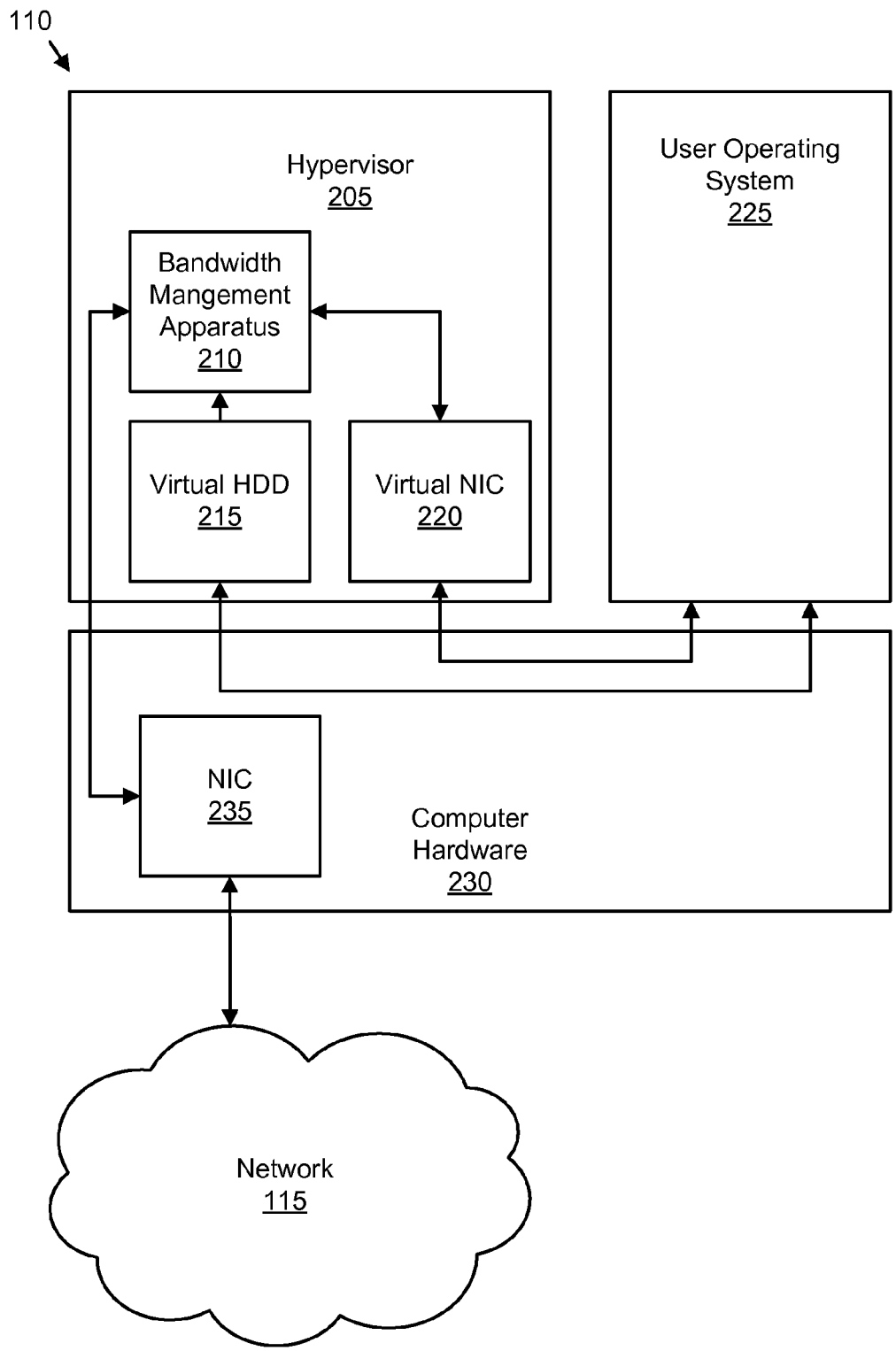
FIG. 2 is a functional schematic block diagram illustrating one embodiment of a peer computer of the present invention.

FIG. 2 is a functional schematic block diagram illustrating one embodiment of a peer computer 110 of the present invention. The peer computer 110 is the peer computer 110 of FIG. 1. The description of the peer computer 110 refers to elements of FIG. 1, like numbers referring to like elements. The peer computer 110 includes a hypervisor 205, a user operating system 225, and computer hardware 230. The hypervisor 205 includes a bandwidth management apparatus 210, a virtual hard disk drive (HDD) 215, and a virtual network interface card (NIC) 220. The computer hardware 230 includes a NIC 235.

The computer hardware 230 communicates with the network 115 of FIG. 1 through the NIC 235. The hypervisor 205 may be a computer program product that executes on the computer hardware 230. In one embodiment, the hypervisor 205 comprises a base kernel. Alternatively, the hypervisor 205 may execute on top of the user operating system 225. The hypervisor 205 supervises the user operating system 225 as is well known to those of skill in the art.

In one embodiment, the computer hardware 230 executes a plurality of user operating systems 225. The hypervisor 205 may manage the various user operating systems 225, dividing processing time between the user operating systems 225 as is well known to those of skill in the art.

The user operating system 225 may communicate with the user through a keyboard, a mouse, and a display. In addition, the user operating system 225 may allow the user to employ one or more application programs that execute on the computer hardware 230 under the user operating system 225.

The computer hardware 230 may be configured as a diskless peer computer 110. As a result, the computer hardware 230 may have no HDD for storing the user operating system 225 and the hypervisor 205. When the user operating system 225 stores and/or retrieves data, the user operating system 225 does so through the virtual HDD 215. The virtual HDD 215 may mimic an actual HDD, allowing the user operating system 225 and any application programs operating under the user operating system 225 to store and retrieve data. However, the virtual HDD 215 communicates data that is to be stored to the bandwidth management apparatus 210. The bandwidth management apparatus 210 and communicates the data that is to be stored through the NIC 235 and the network 115 to a storage subsystem 140.

Similarly, when the user operating system 225 retrieves data from the virtual HDD 215, the virtual HDD 215 communicates the request for data through the bandwidth management apparatus 210, the NIC 235, and the network 115 to the storage subsystem 140. The storage subsystem 140 responds by communicating the requested data through the network 115, the NIC 235, the bandwidth management apparatus 210 and the virtual HDD 215 to the user operating system 225.

Network communications of the user operating system 225 are also routed through the virtual NIC 220. For example, if an application of the user operating system 225 requests data using a Universal Resource Locator (URL) from the network 115, the request is communicated to the virtual NIC 220. The virtual NIC 220 communicates a request through the bandwidth management apparatus 210 and the NIC 235 to the network 115. The requested data is returned from the network 115 through the NIC 235, the bandwidth management apparatus 210, and the virtual NIC 220 to the user operating system 225.

The present invention allows each peer computer 110 of a DPS 100 to manage network bandwidth as will be described hereafter. Thus first, second, and third peer computers 110a-c may autonomously reduce demands on the network 115 to allow a fourth peer computer 110d to perform a bandwidth intensive operation.

Figure 3:
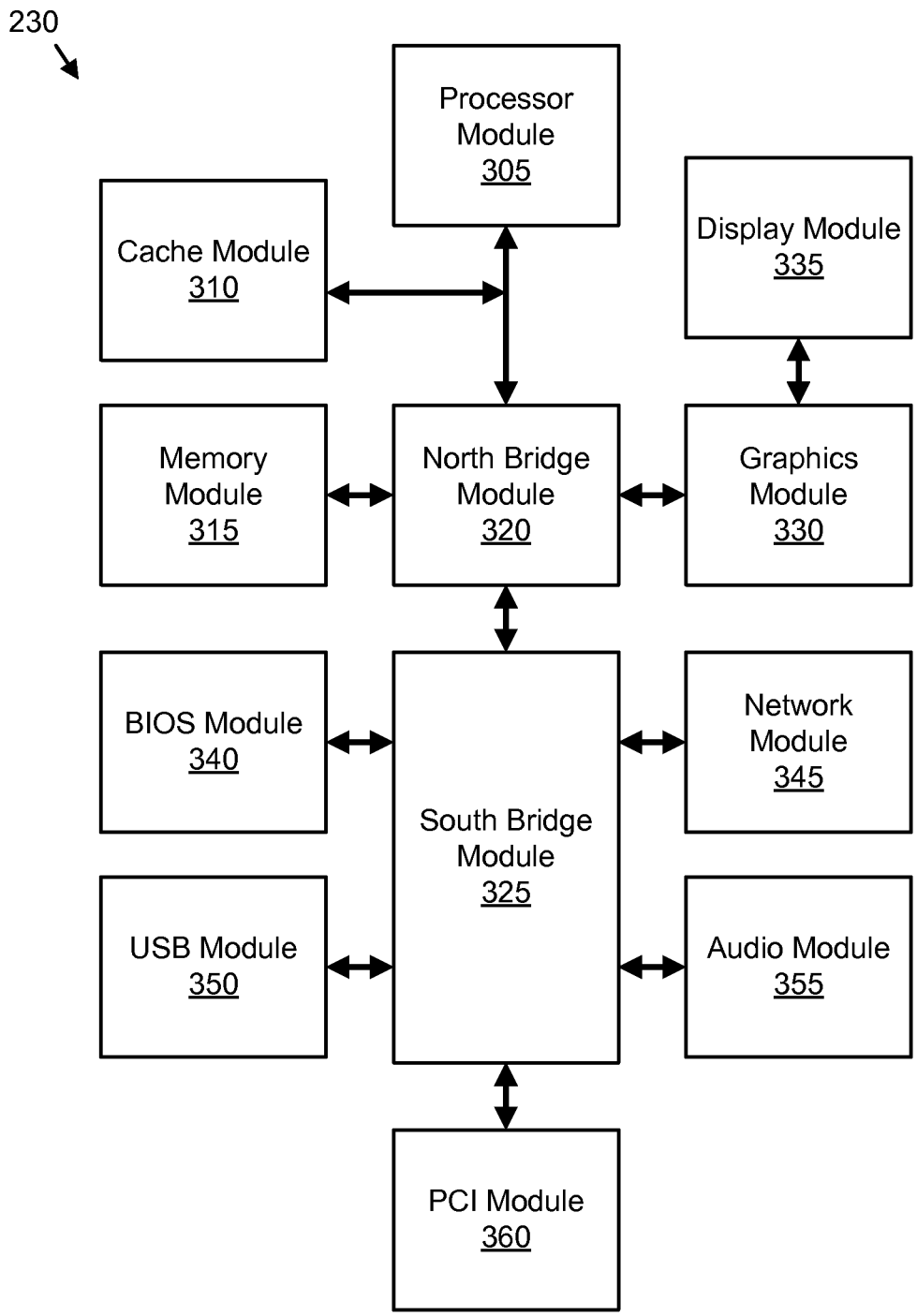
FIG. 3 is a hardware schematic block diagram illustrating one embodiment of computer hardware of the present invention.

FIG. 3 is a schematic block diagram illustrating one embodiment of computer hardware 230 of the present invention. The computer hardware 230 is the computer hardware 230 of FIG. 2. The description of the computer hardware 230 refers to elements of FIGS. 1-2, like numbers referring to like elements. The computer hardware 230 includes a processor module 305, a cache module 310, a memory module 315, a north bridge module 320, a south bridge module 325, a graphics module 330, a display module 335, a basic input/output system ("BIOS") module 340, a network module 345, and a peripheral component interconnect ("PCI") module 360.

The processor module 305, cache module 310, memory module 315, north bridge module 320, south bridge module 325, graphics module 330, display module 335, BIOS module 340, network module 345, and PCI module 360, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 315 stores software instructions and data. The processor module 305 executes the software instructions and manipulates the data as is well known to those skilled in the art. The software instructions and data may be configured as one or more computer readable programs. The computer readable programs may be tangibly stored in the memory module 315 and/or a storage subsystem 140.

The processor module 305 may communicate with the cache module 310 through a processor interface bus to reduce the average time to access memory module 315. The cache module 310 may store copies of the data from the most frequently used memory module 315 locations. The computer hardware 230 may use one or more cache modules 310 such as a DDR2 cache memory or the like.

The north bridge module 320 may communicate with and provide bridging functionality between the processor module 305, the graphic module 330, the memory module 315, and the cache module 310. The processor module 305 may be connected to the north bridge module 320 over a, for example, six hundred sixty seven Megahertz (667 MHz) front side bus.

The north bridge module 320 may be connected to the south bridge module 325 through a direct media interface (DMI) bus. The DMI bus may provide a high-speed, bi-directional, point-to-point link supporting a clock rate for example of one Gigabytes per second (1 GBps) in each direction between the north bridge module 320 and the south bridge module 325. The south bridge module 325 may support and communicate with the BIOS module 340, the network module 345, and the PCI module 360.

The PCI module 360 may communicate with the south bridge module 325 for transferring data or power to peripheral devices. The PCI module 360 may include a PCI bus for attaching the peripheral devices. The PCI bus can logically connect several peripheral devices over the same set of connections. The peripherals may be selected from a printer, a joystick, a scanner, or the like. The PCI module 360 may also be an expansion card as is well known to those skilled in the art. In one embodiment, the NIC 235 is configured as an expansion card in communication with the PCI bus.

The BIOS module 340 may communicate instructions through the south bridge module 325 to boot the computer hardware 230. In one embodiment, the BIOS module 340 loads the user operating system 225 from a storage subsystem 140 through the virtual HDD 215.

The network module 345 may communicate with the south bridge module 325 to allow the computer hardware 230 to communicate with other devices over the network 115. The devices may include routers, bridges, computers, printers, and the like. In one embodiment, the NIC 235 is the network module 345.

The display module 335 may communicate with the graphic module 330 to display the topological display of the user interface elements as will be described hereafter. The display module 335 may be a cathode ray tube (CRT), a liquid crystal display (LCD) monitor, or the like.

Figure 4:
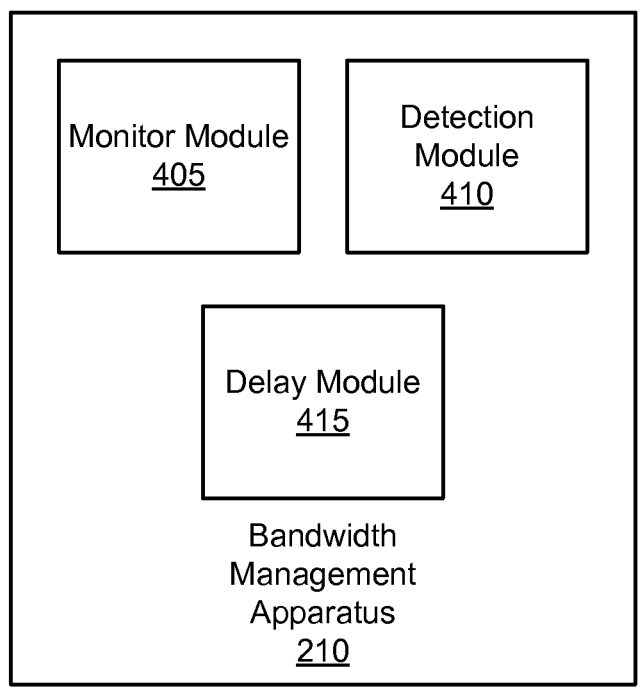
FIG. 4 is a schematic block diagram illustrating one embodiment of a bandwidth management apparatus of the present invention.

FIG. 4 is a schematic block diagram illustrating one embodiment of a bandwidth management apparatus 210 of the present invention. The bandwidth management apparatus 210 is the bandwidth management apparatus 210 of FIG. 2. The description of the bandwidth management apparatus 210 refers to elements of FIGS. 1-3, like numbers referring to like elements. The bandwidth management apparatus 210 includes a monitor module 405, a detection module 410, and a delay module 415.

The monitor module 405, detection module 410, and delay module 415 may be embodied in the hypervisor 205 of FIG. 2. In a certain embodiment, the monitor module 405, detection module 410, and delay module 415 are embodied in the user operating system 225. Alternatively, the monitor module 405, detection module 410, and delay module 415 may be embodied in an application program that is accessed by the hypervisor 205 and/or the user operating system 225.

The monitor module 405 monitors traffic of the plurality of peer computers 110 over the TCP/IP network 115. The monitor module 405 may be configured as one or more computer program products executing on the computer hardware 230.

In one embodiment, the monitor module 405 communicates broadcasts including traffic information for the peer computer 110. For example, the monitor module 405 may broadcast the current utilization of the network 114 by the peer computer 110. The utilization may be measured in kilobytes of data transferred per second (kB/s). Alternatively, the utilization may be measured as percentage of a maximum utilization for the network 115.

The monitor module 405 may communicate the broadcasts to each peer computer 110. The monitor module 405 of each peer computer 110 may monitor the broadcasts of other monitor modules 405.

The detection module 410 detects traffic exceeding a traffic threshold for the network 115. In one embodiment, the traffic threshold comprises utilization of the network 115 in the range of twenty-five to one hundred percent (25-100%). In a certain embodiment, the traffic threshold comprises utilization of the network 115 in the range of sixty-two to one hundred percent (62-100%). The detection module 410 may be configured as one or more computer program products executing on the computer hardware 230.

The delay module 415 delays issuing each TCP/IP acknowledge signal for a specified delay interval in response to detecting the traffic exceeding the traffic threshold as will be described hereafter. In one embodiment, the specified delay interval is in the range of one millisecond to thirty seconds (1 ms-30 s). In a certain embodiment, the specified delay interval is in the range of twenty five to seventy five milliseconds (25-75 ms).

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
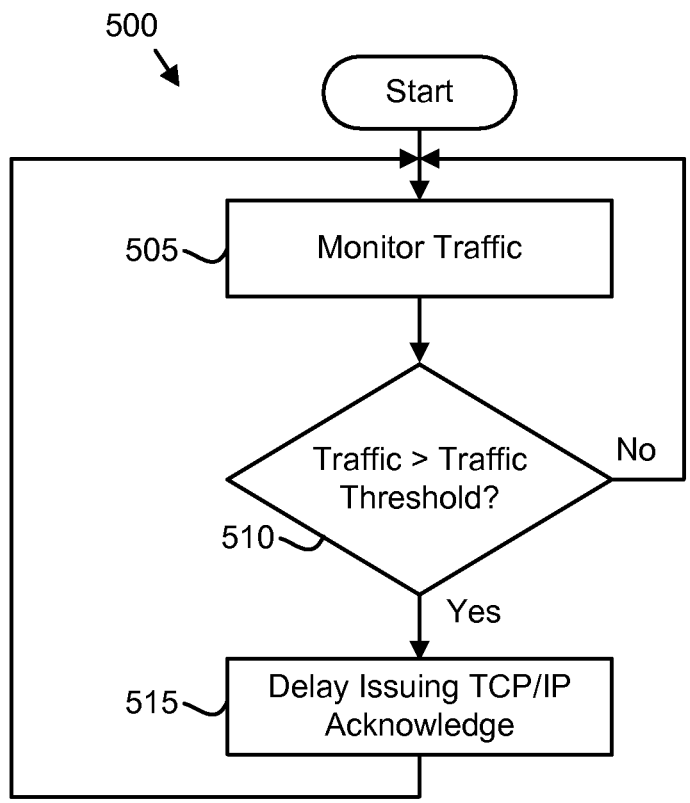
FIG. 5 is a schematic flow chart diagram illustrating one embodiment of a bandwidth management method of the present invention.

FIG. 5 is a schematic flow chart diagram illustrating one embodiment of a bandwidth management method 500 of the present invention. The method 500 substantially includes the steps to carry out the functions presented above with respect to the operation of the described apparatus 110, 230, 210 and system 100 of FIGS. 1-4. In one embodiment, the method 500 is implemented with a computer program product comprising a computer readable medium having a computer readable program. The computer readable program may be executed by the computer hardware 230.

The method 500 begins and the monitor module 405 monitors 505 traffic of a plurality of peer computers 110 over the TCP/IP network 115. In one embodiment, the monitor module 405 monitors 505 the traffic by monitoring traffic information from other peer computers 110. For example, the first peer computer 110a may receive traffic information broadcasts from the second, third, and fourth peer computers 110b-d. The cumulative traffic information may indicate that the peer computers 110 are collectively utilizing sixty-five percent (65%) of the networks available bandwidth.

In the present invention, the monitor module 405 of each peer computer 110 monitors 505 traffic. Thus no peer computer 110 is centrally tasked with monitoring bandwidth utilization of the network 115.

Alternatively, the monitor module 405 may estimate the traffic from a response time of the network 115. For example, the monitor module 405 may track the response times of the network 115 for each request made to the network 115. The monitor module 405 may further estimate that a two millisecond response time is indicative of thirty percent (30%) utilization of the network 115. In a certain embodiment, the monitor module 405 pings the network 115 and determines the utilization of the network 415 from a response to the ping.

In one embodiment, the monitor module 405 queries the network 115 for the bandwidth utilization. The network 115 may maintain bandwidth utilization statistics and reports statistics when queried by the monitor module 405. For example, the network 115 may respond to a monitor module query that the network bandwidth utilization is one hundred twenty-five kilobytes per second (125 kB/s).

In one embodiment, the monitor module 405 also monitors specific requests from the peer computers 110. The monitor module 405 may receive a specific request from a peer computer 110 for increased bandwidth.

In one embodiment, the monitor module 405 broadcasts traffic information gathered from monitoring 505 traffic. For example, the monitor module 405 may broadcast a network bandwidth utilization of the peer computer 110 as well as any other traffic information that the monitor module 405 possesses to other monitor modules 405.

The detection module 410 detects 510 traffic exceeding the traffic threshold for the network 115. For example, if the traffic threshold is twenty-five percent (25%) network utilization, the detection module 410 may detect 510 traffic exceeding the traffic threshold when the network utilization is (30%). In one embodiment, each detection module 410 of each peer computer 110 detects 510 traffic exceeding the traffic threshold.

If the detection module 410 does not detect 510 traffic exceeding the traffic threshold, the monitor module 405 continues to monitor 505 traffic. For example, if the traffic threshold is two hundred kilobytes per second (200 kB/s) and traffic is estimated at one hundred fifty kilobytes per second (150 kB/s), the monitor module 405 may continue to monitor 505 traffic.

If the traffic exceeds the traffic threshold, the delay module 415 delays 515 issuing each TCP/IP acknowledge signal for a specified delay interval in response to detecting the traffic exceeding the traffic threshold. For example, the user operating system 225 may immediately issue a TCP/IP acknowledge command in response to receiving data from the network 115. However, the bandwidth management apparatus 210 may delay directing the NIC 235 to issue the acknowledge signal for the specified delay interval.

In a certain embodiment, the delay interval is increased as traffic on the network 115 increases. For example, if network bandwidth utilization increases from twenty-six percent (26%) to fifty-two percent (52%), the delay interval may be increased four (4) times.

In one embodiment, the delay interval $M_D$ for the first peer computer 110a is calculated using Equation 1, where $T_M$ is a measured network utilization of the first peer computer 110a, $U_A$ is an average utilization for the network, $N_U$ is a number of peer computers 110 with network utilization that is greater than a utilization maximum $U_{MAX}$, $T_N$ is a number of peer computers 110 in the system 100, and $M_{MAX}$ is a maximum delay interval. $U_{MAX}$ may be in the range of twenty to thirty percent (20-30%). In a certain embodiment, $U_{MAX}$ is twenty-five percent (25%).

$$M_D = (T_M/U_A)^2 (1 - N_U/T_N)(M_{MAX}) \qquad \text{Equation 1}$$

In one embodiment, $M_{MAX}$ may be in the range of one to two hundred and fifty milliseconds (1-250 ms). In a certain embodiment, $M_{MAX}$ may be in the range of twenty five to seventy five milliseconds (25-75 ms).

In one embodiment, the delay module 415 does not delay 515 issuing TCP/IP acknowledge signals when the peer computer 110 of the delay module 415 is performing a specified operation. For example, the delay module 415 may not delay 515 issuing TCP/IP acknowledge signals when the peer computer is booting the user operating system 225 over the network 115. Other specified operations may include but are not limited to backup operations, loading application software, performing diagnostics, and the like.

Because the delay module 415 delays 515 issuing each TCP/IP acknowledge signal, the network 115 is delayed from initiating additional communications with the peer computer 110. As a result, the peer computer 110 of the delay module 415 uses less network bandwidth. The delay in communications with the network 115 may be imperceptible to the user of the peer computer 110. However, another peer computer 110 that is performing a bandwidth intensive operation such as loading a user operating system 225 from a storage subsystem 140 may have significantly more available bandwidth to complete the operation.

The method 500 is illustrated for a single peer computer 110. However, when each peer computer 110 of a DPS 100 delays 515 issuing TCP/IP acknowledge signals, the utilization of the network 115 by the peer computers 110 may be substantially reduced.

Figure 6:
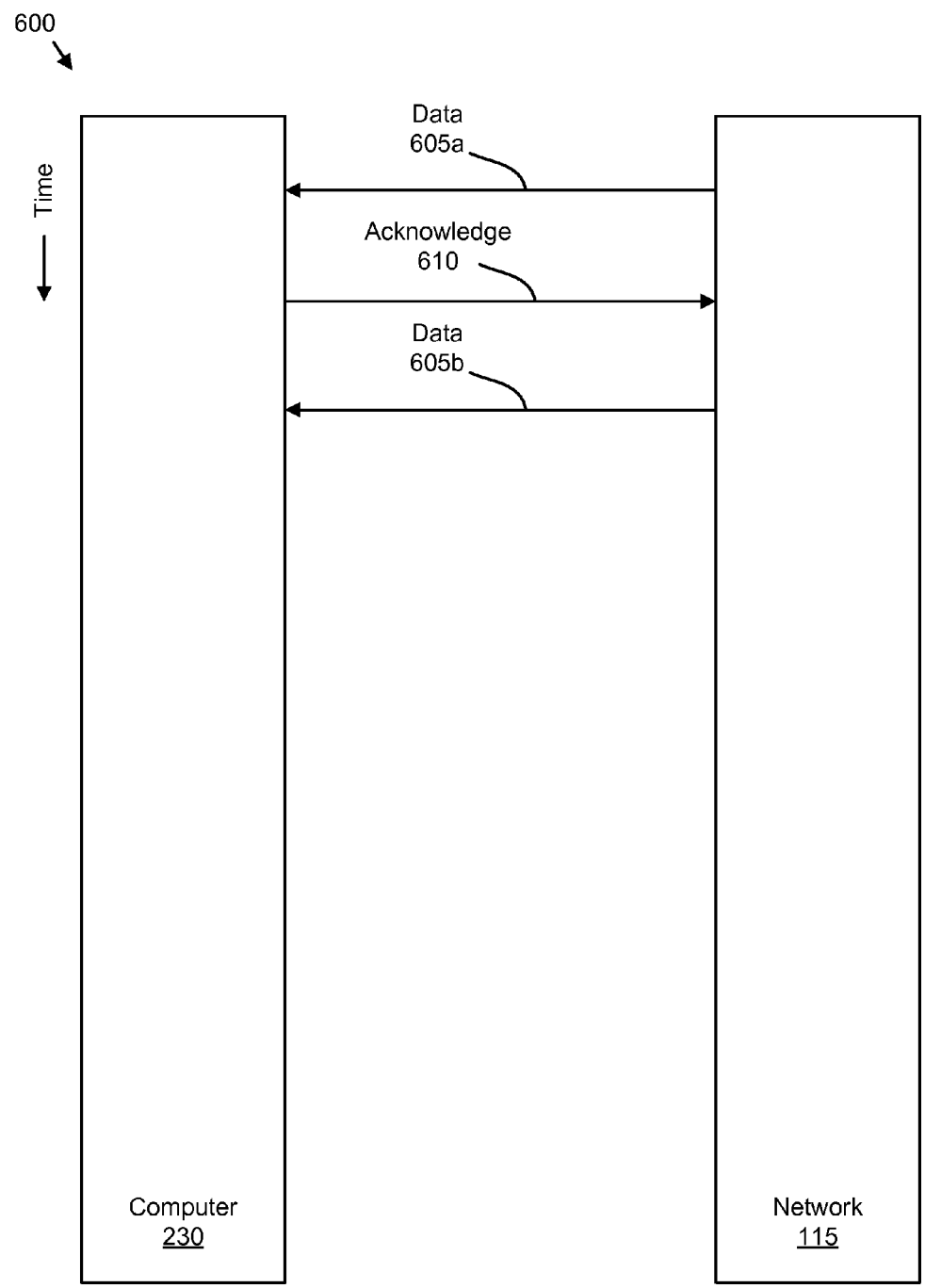
FIG. 6 is a schematic block diagram illustrating one embodiment of a TCP/IP data transfer in accordance with the present invention.

FIG. 6 is a schematic block diagram illustrating one embodiment of a TCP/IP data transfer 600 in accordance with the present invention. The description of the transfer 600 refers to elements of FIGS. 1-5, like numbers referring to like elements.

The exchange of data 605 and acknowledge signals 610 is shown between the computer hardware 230 and the network 115. The vertical axis represents time, wherein transfers shown higher on the vertical axis occur before transfers shown below are on the vertical axis. Longer vertical gaps between data 605 and acknowledge signals 610 indicate longer time intervals. However, the time intervals are not necessarily to scale.

The network 115 is shown transferring first data 605a to the computer hardware 230. In response, the computer hardware 230 may normally without delay communicate an acknowledge signal 610 to the network 115. Upon receipt of the acknowledge signal 610, the network 115 may subsequently communicate second data 605b to the computer hardware 230.

Figure 7:
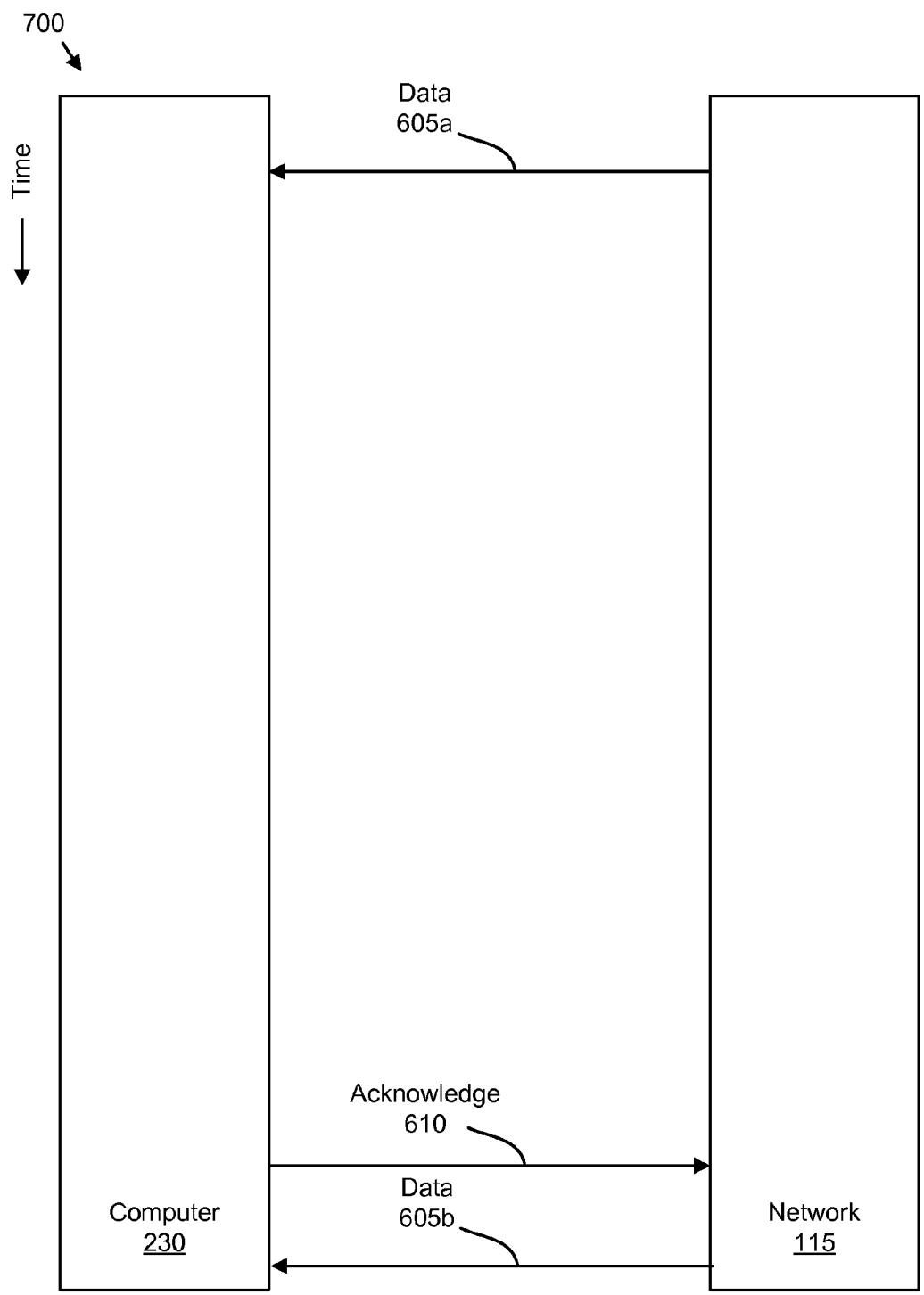
FIG. 7 is a schematic block diagram illustrating one embodiment of a delayed TCP/IP data transfer of the present invention.

FIG. 7 is a schematic block diagram illustrating one embodiment of a delayed TCP/IP data transfer 700 of the present invention. The elements of the schematic block diagram of FIG. 600 are shown with functional modifications of the present invention.

The network 115 transfers the first data 605a to the computer hardware 230. However, because the bandwidth management apparatus 210 is managing the bandwidth of the network 115, and the issue of the acknowledge signal 610 by the computer hardware 230 is delayed. The delay is illustrated by the increased gap on the vertical axis between the first data 605a and the acknowledge signal 610. As a result, additional network bandwidth is available for another peer computer 110 to perform an operation such as booting the user operating system 225.

The present invention delays 515 issuing TCP/IP acknowledge signals 610 to manage network bandwidth. In addition, the present invention may delay some data transfers in order to speed other data transfers. As a result, a plurality of peer computers 110 may autonomously manage network bandwidth utilization. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program stored on a tangible storage device, wherein the computer readable program when executed on a computer causes the computer to:

estimate traffic of a plurality of peer computers over a Transmission Control Protocol/Internet Protocol (TCP/IP) network by monitoring at each peer computer a response time of the network to each request made to the network by the peer computer, wherein each peer computer is a diskless computer and accesses a hard disk drive in a storage area network through the network and the network bandwidth utilization is measured in relation to a maximum utilization for the network;

detect traffic exceeding a traffic threshold for the network; and delay issuing each TCP/IP acknowledge signal for a specified delay interval in response to both detecting the traffic exceeding the traffic threshold and a request from a first peer computer for additional bandwidth.

2. The computer program product of claim 1, wherein the traffic threshold comprises utilization of the network in the range of twenty-five to one hundred percent.

3. The computer program product of claim 1, wherein the specified delay interval is in the range of one millisecond to thirty seconds.

4. The computer program product of claim 3, wherein the specified delay interval is in the range of twenty five to seventy five milliseconds.

5. The computer program product of claim 1, wherein the computer readable program is embodied in a hypervisor that supervises an operating system.

6. The computer program product of claim 1, wherein a value of the delay interval is increased as traffic increases.

7. The computer program product of claim 1, wherein the computer readable program causes the computer to monitor broadcasts from the first peer computer, the broadcasts including traffic information which corresponds at least to the first peer computer.

8. The computer program product of claim 1, the computer readable program further causing the computer to broadcast the network bandwidth utilization.

9. The computer readable program of claim 1, wherein the delay interval $M_D$ is calculated as $M_D = (T_M/U_A)^2 (1-N_u/T_N)(M_{MAX})$ where $T_M$ is a measured network utilization of the first peer computer, $U_A$ is an average utilization for the network, $N_u$ is a number of peer computers with network utilization that is greater than a utilization maximum $U_{MAX}$, $T_N$ is a number of peer computers, and $M_{MAX}$ is a maximum delay interval.

10. An apparatus comprising:
a tangible storage device storing a computer readable program;
a processor executing the computer readable program, the computer readable program comprising:
  a monitor module estimating traffic of a plurality of peer computers over a TCP/IP network by monitoring at each peer computer a response time of the network to each request made to the network by the peer computer, wherein each peer computer is a diskless computer and accesses a hard disk drive in a storage area network through the network and the network bandwidth utilization is measured in relation to a maximum utilization for the network;
  a detection module detecting traffic exceeding a traffic threshold for the network; and
  a delay module delaying issuing each TCP/IP acknowledge signal for a specified delay interval in response to both detecting the traffic exceeding the traffic threshold and a request from a first peer computer for additional bandwidth.

11. The apparatus of claim 10, wherein the traffic threshold comprises utilization of the network in the range of twenty five to one hundred percent.

12. The apparatus of claim 10, wherein the specified delay interval is in the range of twenty five to seventy five milliseconds.

13. The apparatus claim 10, wherein monitor module, detection module, and delay module are embodied in a hypervisor that supervises an operating system.

14. The apparatus of claim 10, wherein a value of the delay interval is increased as traffic increases.

15. The apparatus of claim 10, wherein the delay interval $M_D$ is calculated as $M_D = (T_M/U_A)^2 (1-N_u/T_N)(M_{MAX})$ where $T_M$ is a measured network utilization of the first peer computer, $U_A$ is an average utilization for the network, $N_u$ is a number of peer computers with network utilization that is greater than a utilization maximum $U_{MAX}$, $T_N$ is a number of peer computers, and $M_{MAX}$ is a maximum delay interval.

16. A system comprising:
a TCP/IP network;
a plurality of peer computers, each in communication with the TCP/IP network and each comprising
  a monitor module estimating network traffic by monitoring at each peer computer a response time of the network to each request made to the network by the peer computer, wherein each peer computer is a diskless computer and accesses a hard disk drive in a storage area network through the network and the network bandwidth utilization is measured in relation to a maximum utilization for the network;
  a detection module detecting traffic exceeding a traffic threshold for the network; and
  a delay module delaying issuing each TCP/IP acknowledge signal for a specified delay interval in response to both detecting the traffic exceeding the traffic threshold and a request from a first peer computer for additional bandwidth.

17. The system of claim 16, the monitor module further monitoring broadcasts from the first peer computer, the broadcasts including the network bandwidth utilization which corresponds at least to the first peer computer.

18. The system of claim 17, the first peer computer broadcasting the network bandwidth utilization for the first peer computer.

19. The apparatus of claim 16, wherein the delay interval $M_D$ is calculated as $M_D = (T_M/U_A)^2 (1-N_u/T_N)(M_{MAX})$ where $T_M$ is a measured network utilization of the first peer computer, $U_A$ is an average utilization for the network, $N_u$ is a number of peer computers with network utilization that is greater than a utilization maximum $U_{MAX}$, $T_N$ is a number of peer computers, and $M_{MAX}$ is a maximum delay interval.

* * * * *